Feb. 22, 1927.
U. G. REPLOGLE
1,618,352
AUTOMOBILE TIRE ALARM MECHANISM
Filed May 6, 1925
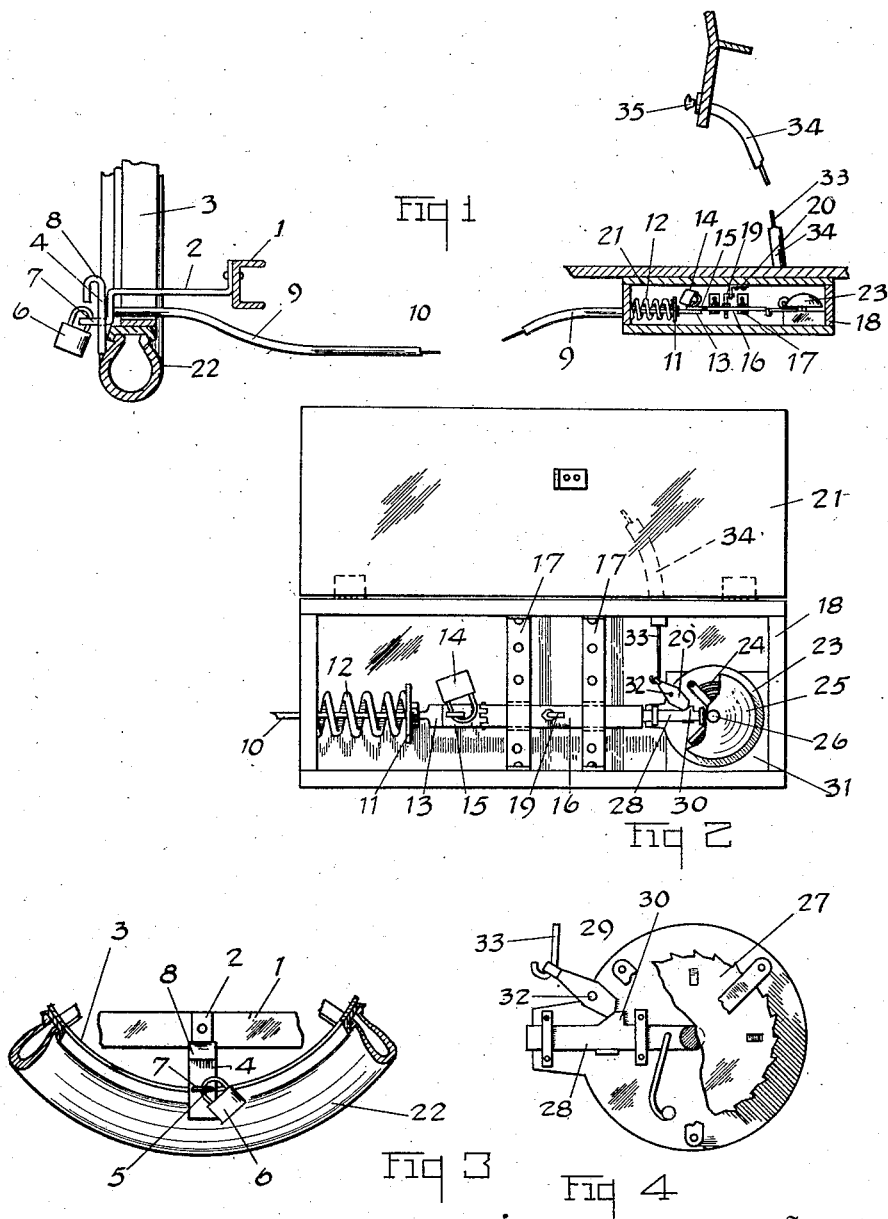

Patented Feb. 22, 1927.

1,618,352

UNITED STATES PATENT OFFICE.

ULYSSES G. REPLOGLE, OF TOLEDO, OHIO, ASSIGNOR OF FORTY ONE-HUNDREDTHS TO HAZEL E. JAQUETTE, TWENTY-FIVE ONE-HUNDREDTHS TO FREDERICK G. REPLOGLE, TWENTY-FIVE ONE-HUNDREDTHS TO JESSE W. BROWN, AND TEN ONE-HUNDREDTHS TO ALBERT G. JAQUETTE, ALL OF TOLEDO, OHIO.

AUTOMOBILE TIRE-ALARM MECHANISM.

Application filed May 6, 1925. Serial No. 28,305.

My invention has for its object to provide a secret lock located more or less remote from the object that is to be secured by the lock and also has for its object to provide an alarm mechanism that may be operated when an attempt is made to remove the object that is secured by the lock, unless the one removing the tire is cognizant of the operation of the locking means and the control of the alarm mechanism. The invention may be used in connection with an additional locking means located in proximity to the object that is to be secured from removal.

In the preferred form of the invention the locking means is adapted to secure an automobile tire from removal and is provided with a lock and an alarm mechanism located remote from the tire and, if desired in a box, that which may be also locked to prevent entrance to the box. Thus a series of operations will be required to remove the tire which will take a considerable time and will effectually prevent removal of the tire.

The invention may be contained in structures that differ in form and, to illustrate a practical application and describe an operation of a structure containing the invention, I have selected one of such structures as an example and shall describe it hereinafter. The structure selected for purposes of illustration is shown in the accompanying drawings.

Figure 1 of the drawings illustrates parts of the locking mechanism, the showing of parts being broken to indicate remoteness of location relative to each other. Fig. 2 is a top view of a box that may be secured below the removable floor boards of the automobile in any suitable manner. Fig. 3 is a view of a part of an automobile tire that is secured by the locking means. Fig. 4 illustrates a part of an alarm mechanism that may be operated by a movement of the tire or of a part of the locking mechanism relative to its supporting rack.

Where the locking mechanism is used for locking an automobile tire a suitable fixed member is secured to a part of the automobile such as to the rear bar or cross bar 1 of the chassis frame of the automobile. The fixed member 2 may be in the form of a bracket that extends to within the tire rack 3 and bent so as to support a tire securing member 4 in position on the rack 3. When the securing member 4 is located in position, the automobile tire will be locked to the rack. The securing member 4 is provided with a slot 5 through which part of the fixed member 2 may extend. The part may be the end portion of the bracket or fixed member 2 and may be provided with an opening for receiving a padlock 6 to lock the securing member 4 in position. Preferably the end portion 7 of the fixed member is made flat and the slot 5 is made oblong so as to prevent rotation of the securing member 4. The padlock 6 will prevent removal of the securing member 4 from the bracket or fixed member 2. The securing member may also be provided with a turned end portion 8 whereby the securing member 4 may be conveniently drawn from the fixed member 2 and rotated when it is desired to remove the tire from the rack.

A rigid tube member, such as a gas pipe 9, extends from the fixed member 2 to a point remote from the automobile tire, such as to a point beneath the floor boards beneath the front seat of the automobile or, preferably, to a point beneath the removable floor boards back of the front seat. A stiff wire, such as a steel wire 10, is located in the pipe 9, and is secured to the securing member 4 and so that when the securing member 4 is drawn away from the automobile tire the wire 10 will also be drawn along the pipe 9. The wire is connected to a disc 11 and a spring 12 is secured intermediate the end of the pipe 9 and the disc 11 to elastically return the wire 10 and the securing member 4 when the securing member 4 is pulled from the tire. The spring 12 has a length sufficient to permit the securing member 4 to be drawn from the end portion 7 of the fixed member 2.

The wire 10 may form a connector member between the securing member 4 and a means for locking the securing member 4 from being moved from the tire. A plate 13 may be connected to the disc 11 and may be provided with a suitable staple for receiving a padlock 14. A hasp 15 may be pivotally connected to a plate 16 that is slidably supported on cross bars 17. The hasp 15 may be placed over the staple, and the two plates 13 and 16 may be secured together and if desired may be locked together by means of the padlock 14. The cross bars 17 may be secured in position relative to the frame of the automobile by any suitable means. Preferably, the spring 12 and the plates 13 and 16 are located in a box 18, the cross bars 17 being, preferably, secured at their ends to the sides of the box. A hook 19 is secured to the plate 16 and a bracket 20, having an eye for receiving the end of the hook 19, is secured to the cover 21 of the box. The hook member 19 is so located with respect to one of the cross bars 17 such that when the connector member or wire 10 is drawn a short distance and before the securing member 4 is drawn from the end of the end portion 7 of the fixed bracket 2, the hook 19 will strike one of the bars 17 and limit further movement of the securing member 4. This movement of the hook member 19, however, is sufficient to remove it from position of engagement with the bracket 20 which is secured to the cover 21. Thus when the securing member 4 is pulled a short distance within the limitations of one of the cross bars 17, with reference to the position of the hook 19 on the plate 16, the cover 21 will be unlocked and may be opened but the tire cannot be removed from the rack 3. On account of the remoteness of the location of the box 18 with reference to the tire rack 3, a suitable object may be placed between the securing member 4 and the bracket 2 to retain the securing member 4 in position against the resiliency of the spring 12, such that the cover 21 may be opened. This will enable the operator to open the cover 21. He may then unlock and remove the padlock 14 and open the hasp 15 to permit the connector member 10 to be further drawn by pulling on the securing member 4. When the lock 6 is removed from the bracket 2 the securing member 4 may be drawn from the bracket and rotated to remove the tire 22. Thus the tire 22 may be locked in position on the rack 3 without the use of the padlock 6 and without the use of the padlock 14, unless the "secret" of the combination is known, since the hasp 15 will engage the staple located on the plate 13 and prevent removal of the tire 22. Thus either or both of the padlocks 6 or 14 may be omitted.

An alarm mechanism 23 is also located in the box 18, the mechanism is provided with the usual spring 24 that may be wound up by any suitable means such as by the rotation of the bell 25 or rotation of the thumb nut 26 and the usual ratchet 27 may be used for operating a hammer to strike the bell 25 in the manner well known in the art. Also the usual bolt 28 is provided for frictionally engaging the hub of the ratchet 27 to prevent its rotation under the action of the spring 24. The end of the plate 16 may be turned down to form a foot for engaging the end of the bolt 28 and, under the pressure of the spring 12, to press the end of the bolt 28 against the hub of the ratchet 27 and thus prevent the alarm 23 from sounding. When, however, the connector member is drawn so as to pull the plate 16 away from the bolt 28 the ratchet 27 is released and the alarm is sounded, even though the hook 19 is drawn against one of the bars 17. So that if any attempt is made to remove the tire by pulling on the securing member 4 the alarm 23 will be sounded. In order to prevent the sounding of the alarm when the driver is to remove the tire, a dog 29 is moved to engage a lug 30 on the bolt 28 and so as to lock the bolt 28 against the hub of the ratchet 27. The dog 29 is pivoted to the base of the alarm mechanism, such as to the plate 31, and in position to engage the lug 30 when the dog 29 is rotated about its pivot pin 32. The dog 29 is connected to a wire 33 located in a tube 34. The wire 33 and the tube 34 extend to some fixed part of the machine, preferably to a hidden point. The wire 33 terminates in a knob 35 that may be pulled and pushed to move the dog 29 about its pivot pin 32 to engage and disengage the lug 30 of the bolt 28. The knob 35 is thus pulled when the operator desires to remove the tire 22 and prevent the sounding of the alarm. The alarm may be again set, that is, the bolt 28 may be released by pushing the knob 35 when the tire is locked.

I claim:

1. In an automobile tire alarm mechanism, a tire bracket for supporting a tire and its rim, a bracket located in proximity to the tire support, a plate having a slot for fitting the end of the bracket and movable along the bracket and located so as to be engaged by the tire when removed from its support, a wire connected to the plate and extending to a point remote from the tire, a container located at a point remote from the tire, the wire extending into the container, a tube extending from the bracket to the container for enclosing the wire, the container having a cover, a finger member within the container for engaging and locking the cover, a longitudinally movable bar for supporting the finger, means for connecting the longitudinally movable bar with the wire, an alarm mechanism located in the container, a longitudinally movable rod for engaging the alarm mechanism and engaged by the bar, a spring operating to move the bar and the said rod to draw the plate against the tire and maintain the finger in locking engagement with the cover and the rod in engagement with the alarm mechanism for normally preventing the operation of the alarm mechanism.

2. In an automobile tire alarm mechanism, a tire bracket for supporting a tire and its rim, a bracket located in proximity to the tire support, a plate having a slot for fitting the end of the bracket and movable along the bracket and located so as to be engaged by the tire when removed from its support, a wire connected to the plate and extending to a point remote from the tire, a container located at a point remote from the tire, the wire extending into the container, a tube extending from the bracket to the container for enclosing the wire, the container having a cover, a finger member within the container for engaging and locking the cover, a longitudinally movable bar for supporting the finger, means for connecting the longitudinally movable bar with the wire, an alarm mechanism located in the container, a longitudinally movable rod for engaging the alarm mechanism and engaged by the bar, a spring operating to move the bar and the said rod to draw the plate against the tire and maintain the finger in locking engagement with the cover and the rod in engagement with the alarm mechanism for normally preventing the operation of the alarm mechanism, a dog for engaging the rod to prevent release of the alarm mechanism when the plate is drawn from the tire and means for operating the dog to release the rod and render it responsive to the movement of the plate.

In testimony whereof I have hereunto signed my name to this specification.

ULYSSES G. REPLOGLE.